(No Model.)  3 Sheets—Sheet 1.
B. G. DEVOE.
IRON FENCE.
No. 254,866.  Patented Mar. 14, 1882.
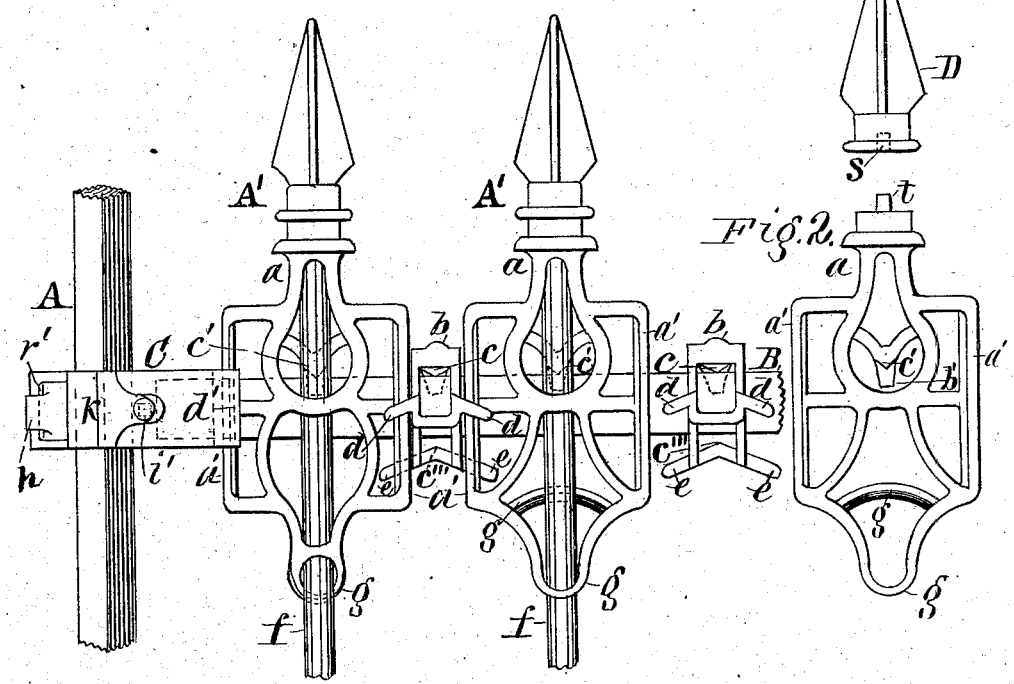
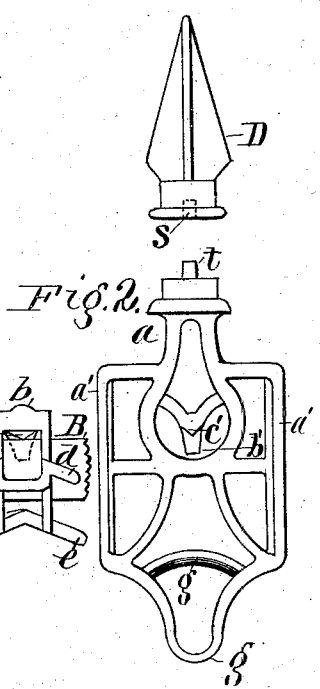
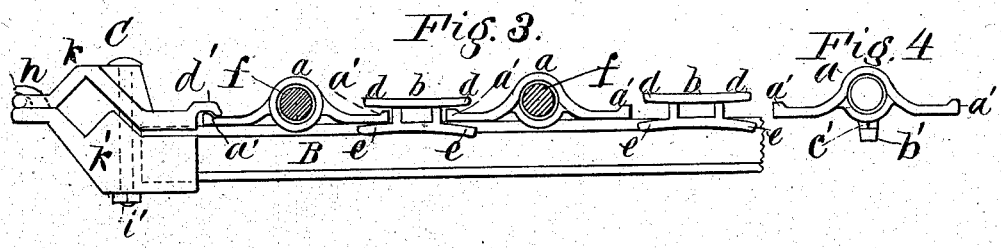
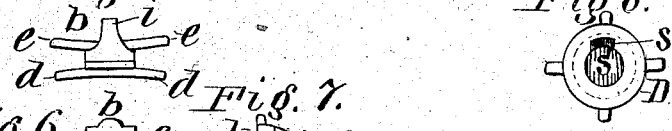
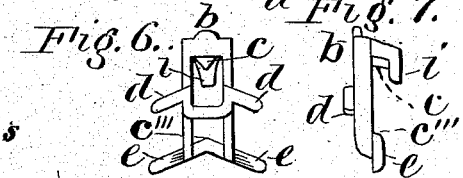
Witnesses
Inventor
Benjamin G. Devoe (No Model.) 3 Sheets—Sheet 2.
B. G. DEVOE.
IRON FENCE.
No. 254,866. Patented Mar. 14, 1882.
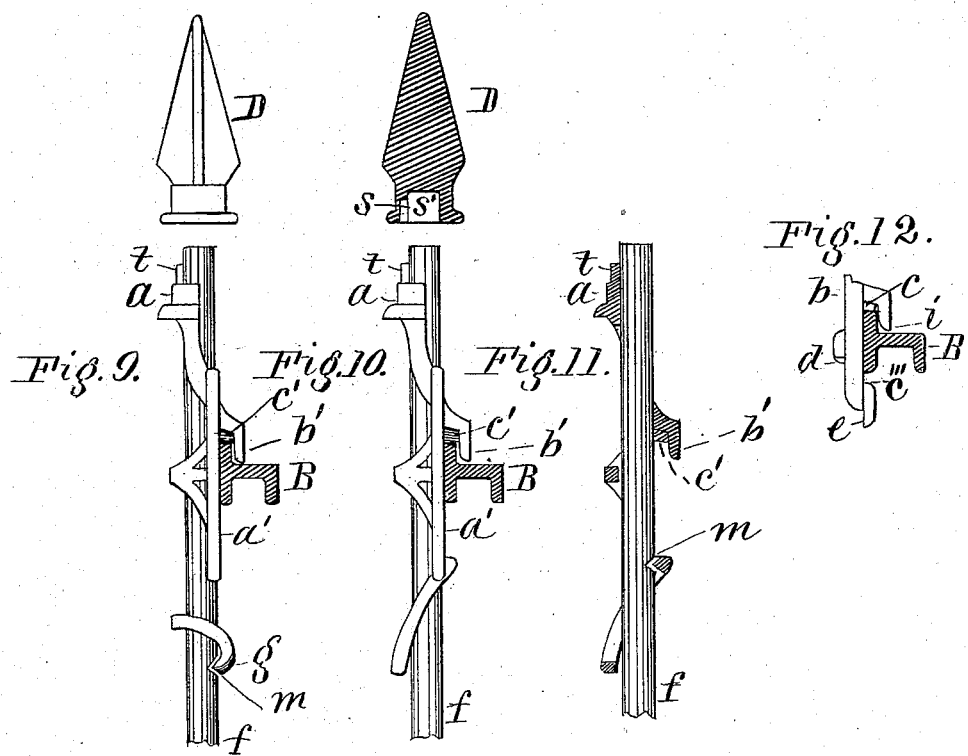
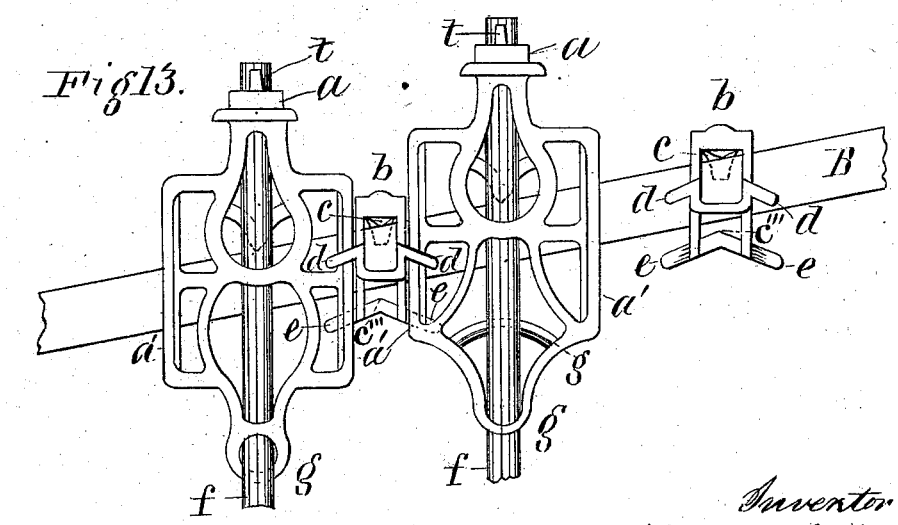

(No Model.)  B. G. DEVOE.  3 Sheets—Sheet 3.
IRON FENCE.
No. 254,866.  Patented Mar. 14, 1882.
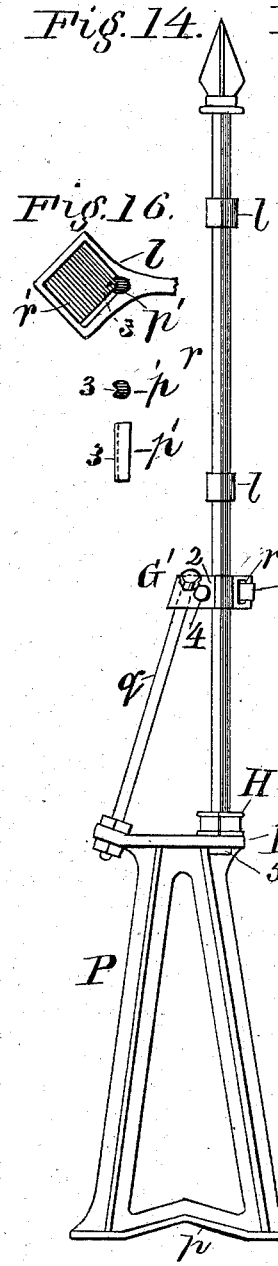
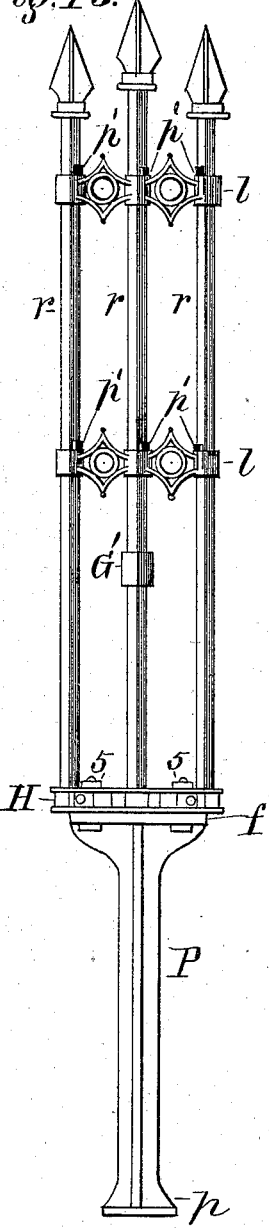
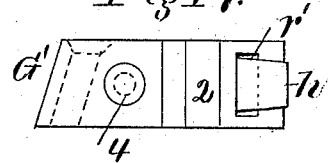
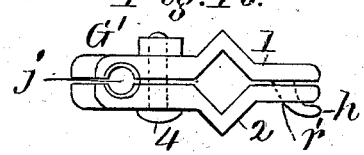
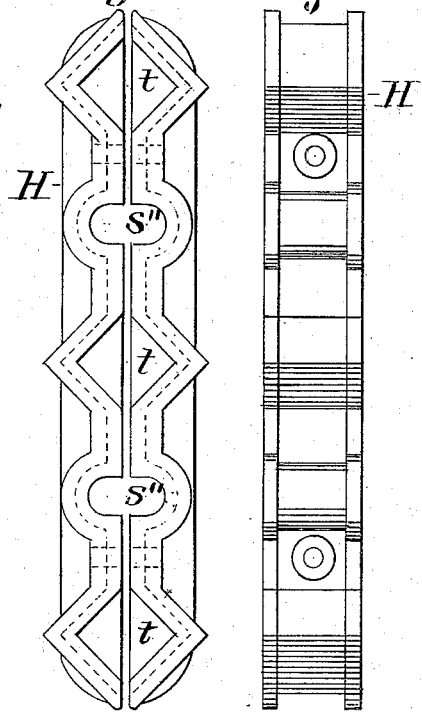
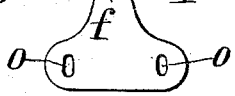
Attest:
M. M. Converse
Ora Converse
Inventor.
Benjamin G. Devoe,
B. C. Converse, Atty.

UNITED STATES PATENT OFFICE.

BENJAMIN G. DEVOE, OF KENTON, ASSIGNOR OF ONE-HALF TO ALBERT C. RAMSAY, OF BELLEFONTAINE, OHIO.

IRON FENCE.

SPECIFICATION forming part of Letters Patent No. 254,866, dated March 14, 1882.

Application filed December 12, 1881. (No model.)

*To all whom it may concern:*

Be it known that I, BENJAMIN G. DEVOE, of the city of Kenton, in the county of Hardin, in the State of Ohio, have invented certain new and useful Improvements in Iron Fences, of which the following is a specification.

My invention relates, first, to the construction of certain members of iron fence, whereby it can be put together or set up in a much less time than iron fence as now constructed.

My invention relates to certain improvements in the brackets or supporting ornaments of iron fences, whereby they may be more easily adapted to inclined grades; also, in the clamp or clip connecting the ornament-frames and securing their side bars to the rail, whereby they are more strongly fastened together, and are also adapted to inclined grades equally well with the supporting ornament of the picket.

My invention relates, further, to a picket having a separable head and a peculiar fastening, by which the head is secured to the end of the rod and the ornament of the picket at the same time, these fastenings enabling the builder to keep the angles of the picket-heads in line.

My invention relates, further, to a picket having an ornament cast with an inner angle on its loop end and a corresponding notch made in the rod, into which the loop-bar is fitted, so as to hold the rod from longitudinal displacement, either by gravity or otherwise.

My invention further relates to the line-post in the fence, which is constructed in such manner as to form a short section of the fence, the pickets of said post being placed in line with the rail-pickets, while the base of the post has its greatest width transversely to the line of the fence.

My invention further relates to the construction of the bases of the posts, whereby they are more easily adjusted to a level in the bottom of the post-hole, and stand more firmly therein when planted.

My invention relates, further, to the manner of securing the upper section of the line or connecting post to its base, whereby it may be readily adjusted upon the latter, after it is set, in bringing it into line with the other parts of the fence.

My invention relates, further, to the manner of securing the bands or girdles in place upon the upright bars or pickets of the post.

In iron fences having wrought rods with malleable ornaments, as heretofore constructed, the clamps connecting the pickets to each other are slipped on over the end of the rail, the picket being first placed in position. This process of setting up fence is necessarily slow and tedious. After the parts are set up and connected, in adjusting them to line, if by accident any portion is broken or a defective part is to be replaced, the picket clamps or clips connecting them must be all slipped off over the rail again in order to get to the defective piece to remove it, so that a great amount of work must be done to get the fence completed.

In my mode of constructing the picket-clamp both it and the pickets which it connects are all put on and fastened in their place without the necessity of slipping any part over the end of the rail, all of them being placed upon the rail and secured from the front side of the same, the picket and clamp or clip requiring but a slight movement (in line with the rail) to fasten them securely together. Both the pickets and clamps are constructed with a single supporting-hook, having an angle at the bearing point which rests upon the rail, this point being central in the piece, so that they can be readily inclined to either side in running the fence upon a sloping or inclined grade.

Three sheets of drawings are herewith annexed.

Figure 1 is a front elevation of piece of the top rail and pickets of my improved fence with a part of the line-post to which it is connected. Fig. 2 is a front elevation of one of the upper ornaments, showing its separable picket-head detached. Fig. 3 is a view from the under side of the rail and ornaments connected therewith, seen in Fig. 1, the post-bar being removed from its clamp. Fig. 4 is also an under view of the ornament shown in Fig. 2. The spear-heads are not shown in Figs. 3 and 4. Fig. 5 is a top view of the clamp which connects the ornaments. Fig. 6 is a front and Fig. 7 a side view of the same. Fig. 8 is a view from the under side of the base of the spear-head to show the manner in which it is connected with the rod and ornament. Fig. 9 is an edge view of one of the pickets shown in Fig. 1, with a cross-section of the rail. The head is detached. The means for supporting the ornament upon the rod is also shown. Fig. 10 is similar to Fig. 9, with the point of support removed, and with the spear-head shown in vertical section. Fig. 11 shows a vertical transverse section of the ornament and the means of its support upon the rod, the head being removed. Fig. 12 shows a cross-section of the rail and a side view of the connecting-clamp attached. Fig. 13 is a front view of two of the pickets seen in Fig. 1, with heads removed, set upon a piece of inclined rail. A detached clamp or clip is also shown hung upon the rail near one of the ornaments, to show the manner of connecting the latter. Fig. 14 is a side view of the line-post. Fig. 15 is a front view of the same. Fig. 16 is an enlarged view of one of the post-pickets in cross-section, and the pin or key securing it in the girdle. Detached views in cross-section and elevation of the key are also seen in this figure. Fig. 17 is a side elevation of a buckle-clamp which connects the brace with the middle picket of the line-post, enlarged. Fig. 18 is a top view of the same, enlarged. Fig. 19 is a top view of the two sections of the foot-clamp of the line-post seen in Figs. 14 and 15, enlarged. Fig. 20 is a side view of the same bolted together. Fig. 21 is a top view of the base of the line-post.

In Fig. 1, A represents a square upright rod or bar of a post, to which the rail B is connected at the end by the buckle-clamp C.

A' A' are the pickets, attached to the rail by hooks b' on the rear of the ornament. These hang over the upturned flange of the rail. The side bars, a', of the ornaments are connected by an interposed clamp or clip, b, which also has a hook on the rear side, at the top end, that hangs over the top flange of the rail B. In setting up the fence, after the rail is connected with the post and before tightening the buckle-clamp C, by which this connection is made, the bar a' of the ornament on the first picket placed is slipped under the hook d' of the plate k of the clamp C, (which latter will be hereinafter more fully described,) by which it is held. The clamp is then tightened upon the picket and rail, connecting both to the post-bar. The same operation applies when two or more rails are used, the bolt and nut i' extending from front to rear through the buckle-clamp being used to secure the parts together. A clamp for this purpose is in use, and I do not claim this device, broadly, though certain parts in the one herein shown are new. After the first picket is secured on the side next the post, the connecting-clamp b is then hooked on, as seen on the right end of the rail in Figs. 1, 2, and 13, and slipped up toward the bar a' of the ornament until the end of the lower and longer lug, e, is behind the bar a', which holds the clamp level, preventing its opposite side from springing inward toward the rail, as is the case with the clamps or clips heretofore used, which require a cold-chisel to be used to raise the disconnected side lugs enough to let the bar of the next picket ornament pass under it. The next or second picket is now hooked onto the rail-flange, and its bar a' pushed over the end of lug e and under lug d on the opposite side. The parallelism of the side bars of both ornament and clamp is by this means preserved until the whole are pushed together, when it will be seen by reference to the figures that the lugs d and e straddle the bar a' of the ornament, and as these lugs incline outward from each other or from the same vertical line the bar a' is tightened as it reaches the side bar of the clamp, thus firmly securing the several members together.

The side bars of the ornament and the clamp being vertical and parallel, they are specially adapted to being inclined, as seen in Fig. 13. I desire that this feature of my invention be distinctly understood, as the merits of the improvement in practice, as compared to the picket and clip connections in my former patents, are plainly distinguishable. Instead of the distortion and irregularity from the necessary displacement of the lines of ornamentation in the fences heretofore made when run upon an inclined grade, in my improvement the regularity and parallelism of these lines are preserved irrespective of the inclination of the rail in either direction. As the hook on both the picket and clamp is made with an angle bearing upon the top of the rail, it allows of their lower ends being swung either to the right or left in placing them, to suit the inclination given to the rail. It will be readily seen that neither a picket nor a clamp can be adapted to an inclined rail if it has both an upper and an under bearing hook or lug, as any inclination of either piece will be arrested by the locking of the bearings upon the rail. I therefore desire that the feature of the single angular bearing of both picket and clamp on the top of the rail be understood as a distinctive element of my invention. The upper lugs, d, as well as the lower ones, e, are inclined downward toward either side, so as to preserve uniformity in the relation of the parts. To strengthen the lower portion of b, the limbs e unite in an elevated angle opposite the top bearing, c. Sufficient space is left between them to allow the piece to be set to any required angle on the rail-face.

The buckle-clamp C, Figs. 1 and 3, consists primarily of two pieces, k and k'. The plate k on the front has a slot, r', in its post end, through which a curved hook, h, cast on the rear plate, k', extends in the form of a fixed buckle-tongue. By this means the two pieces are connected on the inside of the post-bar A. The rear plate, k', is hollowed out to fit the rail end. The post ends of the clamp are hooked together before connecting its opposite end with the rail and picket, thus obviating the necessity of a second bolt. The plate k has a hook, d', on its rail end, which catches firmly over a raised flange on the frame-bar a' of the ornament, and holds it securely against the face of the rail. The ornament is made in two parts, as seen in Figs. 2, 4, 8, 9, 10, 11, and 13.

In order to strengthen the connection of the ornament with its spear-head D, the rod or bar f extends far enough above the ornament to give it a firm hold in the hole s' in the head. To prevent the latter from turning, a tang, t, on the top and front side of the ornament extends into a seat, s, cast in one side of the hole s'. This also enables the workman in setting up the fence to get the angles of the spear-heads or other top ornaments in line. When the head is driven on it is firmly fastened. The ornaments are made with angles g and g on one or more of the bars of the ornament which are in contact with the rod. By preference these angles are made on the loop end, as seen in Fig. 9, though they may be made on one of the other bars crossing the rod, as seen in Fig. 11. A notch, m, is made in the picket-rod, (by preference on the rear side,) and the angle of the bar of the ornament rests in this notch. In Fig. 1 the loop is seen resting upon alternate sides to show that it may not be confined in its application to one side only. This mode of fastening obviates the necessity of any other fastening to secure the ornament and rod together.

The angular bars can be set into the notches so as to prevent any danger of longitudinal displacement.

Much trouble has been experienced in setting the base of a post in which the bottom plate is in horizontal line, as any inequality or variation from a level in the bottom of the post-hole prevented the proper adjustment of the post to a perpendicular without the removal of more or less dirt therefrom. To avoid this I construct the bottom plate of my post-base P (see Figs. 14 and 15) with a raised angle, p, in the middle and a corresponding hollow or depression on the under side, so as to leave an open space under that part, into which any loose dirt may be shifted in adjusting the post to its proper position. When the hole is filled around and over this bottom plate it secures it firmly to its place. The two upright standards of the base are not unlike those now in use, diverging downward and connected by the bottom plate, as shown. In securing the bottom ends of the line post seen in Figs. 14 and 15 to its base, the base-clamp H, Figs. 19 and 20, is used. This consists of the two flanged sections shown, each the counterpart of the other. They have three square sockets, t t t, in them. These sockets do not extend through them downward farther than the lower flange. In these are set the three upright bars r r r, Fig. 15, and the plates are then clamped together by bolts passing transversely through them, as seen in Figs. 15 and 20. After being secured to the trio of pickets which form the post, the base is then attached and secured by the bolts 5 5, which are inserted through the oblong holes s'' (see Fig. 14) and the holes o, of similar shape, in the top f' of the base P.

It will be seen that the object of making the holes s'' and o oblong is to provide for lateral adjustment, so that the line-post may be brought into line with the rest of the fence. The construction of the parts H and f with oblong holes extending across the fence, or transversely to the picket-line, provides for all the adjustment required.

The clamp H is divided vertically and longitudinally, so that one-half of the sockets t and one-half of the oblong holes s'' are in each piece, as will be seen by reference to the enlarged view, Fig. 19. The pickets in the line-post are set to correspond with the fence pickets on the rail, all being in line therewith. By this arrangement there is a saving of rail-pickets, as will be noticed, of at least one-sixth in the length of a panel.

A buckle-clamp, G', (seen in Figs. 14 and 15, and in the enlarged views 17 and 18,) is used to connect the top end of a side brace, q, with the middle picket of the line-post, the brace q extending from the rear angle of the top plate, f', of the base P, where it is made adjustable by the clamping-nuts 6 and 7. The buckle-clamp G' is like the one (G) seen in Figs. 1 and 2, with respect to its self-connecting end formed by the tongue h hooking into loop r'. The rear end, however, differs in having grooves cast diagonally in it and a countersink for the end of the brace q, these grooves forming the hole j when the two sections 1 and 2 are bolted together. (See Fig. 18.) A bolt, 4, is used to fasten the sections of the clamp together.

The girdles l of the line-post are secured in their places by a key, p', which is driven at the angle of the hole formed for the picket. This key is of novel shape, being made round and slightly tapering, with a V-shaped groove cut from end to end on one side. By reference to Fig. 16 it will be seen that the groove 3 straddles the picket-angle, so that when the key is driven, as seen in Fig. 16, it forces the two forward sides against the girdle-frame and securely fastens it.

I am aware that keys have been used to fasten bands and girdles upon pickets; but these have been always driven on one side of the picket instead of at the angle, and in many cases the girdle is broken out and spoiled thereby, whereas in my mode of keying the pieces by driving it at the angle, and in having the key formed with a groove in it to straddle the angle of the picket-bar, this danger is obviated.

The key p' may be round or otherwise shaped. By preference I use a round key grooved as shown. In the detached views, Fig. 16, the key is shown in cross-section and elevation, the latter showing the groove in dotted lines.

I claim as my invention—

1. A clamp for connecting the rail-picket and post together, in two vertically-divisible sections, with self-connecting devices at one end, and a hook on the front section, at the other end, for catching over the side bar of the ornament of the picket, whereby the latter is held, in connection with the rail, to the post, when bolted together as specified.

2. In a fence-picket constructed with a wrought-iron rod and malleable ornaments thereon, as shown, an ornament having a separable spear-head with a hole in the base end for the picket-rod, and having a key-seat or groove cast in one side of said hole for the insertion of a tang formed upon the top of the ornament and extending above the latter, whereby the head is firmly fastened upon the picket and prevented from turning, as set forth.

3. In iron fences having wrought rods and malleable ornaments, a clamp for connecting the rail and end picket with the post, in two sections, having self-connecting devices at the post end and a hook at the opposite or rail end cast upon the front plate for connecting with the ornament of the picket, whereby said ornament is clamped to the rail, prevented from lateral displacement, and at the same time allowed sufficient movement to incline the picket when adjusting it to the grade.

4. The buckle-clamp C, having its sections $k$ and $k'$ self-connecting at the post end by means of the loop $r'$ and hook $h$, and having an inwardly-bent hook, $d'$, on the rail end of plate $k$, for catching over the bar $a'$ of ornament $a$, securing it to the rail and preventing the picket from lateral displacement, or the rail from being withdrawn from its fastening, as shown and described.

5. A clamp for connecting the ornaments of an iron fence, having a bearing hook provided with an angle on the under side of the same, where it rests upon the rail, having parallel sides and lateral lugs extending from either side of its frame-bars, the upper arms or lugs extending from the front, and the lower and longer lugs extending from the rear side of said frame-bars, and diverging from their point of union with the body of the clamp to their ends, so as to straddle the side bar of the ornament-frames and hold it tightly when connected together, as shown and specified.

6. In iron fences constructed with wrought rods and malleable ornaments, a bracket or supporting ornament for a picket, having its bearing-hook formed with an angle on the under side of the same, where it rests upon the rail, to allow the lower end of the picket to be swung to the right or left to suit the inclination of the rail, substantially as hereinbefore specified.

7. In iron fences constructed with wrought rods and malleable ornaments, a clamp or clip for connecting said ornaments, having a single bearing-hook, vertically central therewith, extending rearward from the top end, and having an angle on its under side for a bearing upon the top of the rail to allow it to be placed in its position from the front of the rail, and to adapt it, in connection with the pickets, to be inclined either to the right or left to suit the rail when the latter is inclined, substantially as hereinbefore set forth.

8. A clamp or clip for connecting the pickets of iron fences, having a hook extending from the rear side, at the top end, vertically central with the body thereof, said hook being formed with an angle on its under side, as described, and having lateral extending limbs or lugs from either side for clamping the picket ornament on both its front and rear sides, whereby it may be more securely fastened and greater strength given to the connections, and allowed to be inclined in either direction to suit any inclination of the rail, substantially as shown and specified.

9. The clamp or clip $b$, having parallel sides, the hook $i$, with an angle, $c$, on its under side, the lateral limbs $d$, extending from its front sides, near the middle line thereof, and the lateral limbs $e$, extending from its rear sides at the lower end, and connected centrally, forming the angle $c'''$, said limbs $e$ being extended beyond the limbs $d$ for catching under the side bar of the ornament-frame in guiding the latter into its place between the lugs $d$ and $e$, and to prevent the clamp from tilting during the operation of connecting the pickets therewith, as hereinbefore set forth.

10. A clamp or clip for connecting the ornaments of pickets in iron fences with the rail, having a single bearing-hook, and having front and rear lugs extending from its side bars and diverging laterally from each other, each pair of lugs connected across the body of the clamp for the purpose of strengthening the same, and, with reference to the front upper limbs, of connecting the lines of ornamentation at the middle of the ornament and clamp.

11. A foot-plate, H, for line-posts, divided vertically and longitudinally in the center, and having the sockets $t\ t$ for inserting the pickets therein, and the oblong transverse holes $s''$ for adjusting the post upon its base P when attaching it thereto, substantially as shown and specified.

12. A buckle-clamp, G, in two sections, 1 and 2, for connecting the top end of the brace to the post in an iron fence, having self-connecting devices $r'$ and $h$ at one end, and an inclined hole, $j$, formed by a groove cast in the inside surface of each section at the opposite end for securing the upper end of the brace-rod $q$, and connecting the same with the post-bar when clamped in place and secured by the bolt 4, as shown and specified.

BENJAMIN G. DEVOE.

Attest:
B. C. CONVERSE,
R. A. PIERCE.